S. O. NEELY.
PLOW STOCK.
APPLICATION FILED JAN. 16, 1914.
1,095,987.
Patented May 5, 1914.
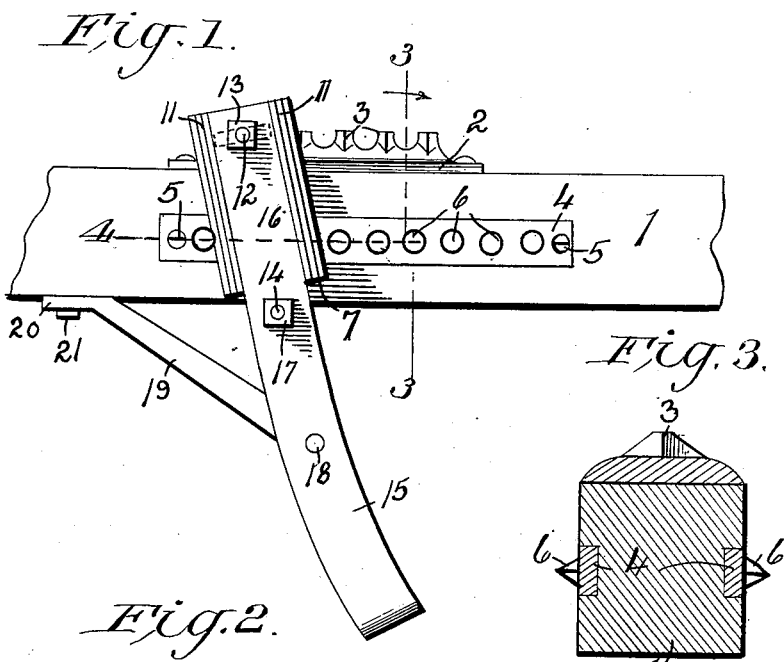
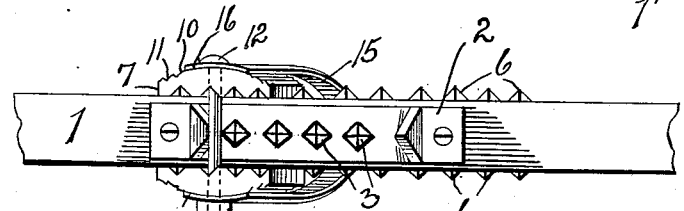
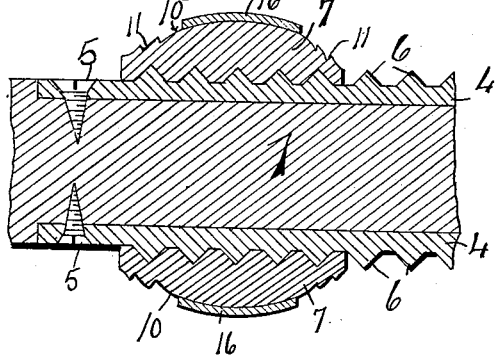
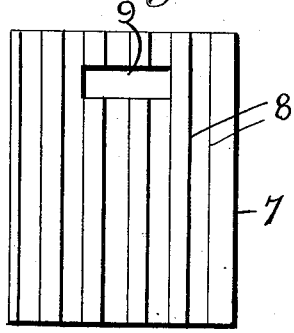
Witnesses
Jos. A. Ryan
L. B. James
Inventor
Samuel O. Neely
By George W. Sub.
Attorney

UNITED STATES PATENT OFFICE.

SAMUEL O. NEELY, OF SHUBUTA, MISSISSIPPI.

PLOW-STOCK.

1,095,987.  Specification of Letters Patent.  Patented May 5, 1914.

Application filed January 16, 1914. Serial No. 812,442.

*To all whom it may concern:*

Be it known that I, SAMUEL O. NEELY, a citizen of the United States, and a resident of Shubuta, in the county of Clarke and State of Mississippi, have invented certain new and useful Improvements in Plow-Stocks; and the primary object of my invention is to provide an adjustable plow-stock to which any plowshare or colter-shovel may be attached and which can be accurately adjusted to nicely balance the plow-beam and precisely hold the plow in a proper line of advance.

Another object is to provide a plow stock so constructed that the same can be nicely adjusted to counteract the side strain and dip of the plow beam, incident to the plow being drawn through the soil.

A further object is to provide a plow stock of a simple and inexpensive nature and of a compact and durable construction, which shall be capable of convenient and accurate adjustment in position upon a plow beam, to properly hold a plow to its work.

With these and other objects in view the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification and in which like numerals of reference indicate similar parts in the several views, Figure 1, shows a side elevational view with parts removed of a plow beam to which a plow stock is adjustably attached, constructed according to my invention. Fig. 2, is a top view of Fig. 1. Fig. 3, is a section on line 3, 3 of Fig. 1. Fig. 4, is a section on line 4, of Fig. 1. Fig. 5, shows a detached detail of one of the yoke blades disclosing the inner serrated face.

In my present invention I provide a plow stock by means of which a plow or a colter blade may be perfectly adjusted so that the same may be drawn through the earth without any undue strain upon the draft animal, and insuring the plow being conveniently handled and easily guided when in operation.

In the accompanying drawings the numeral 1, designates a fragmentary portion of a plow beam to the upper edge of which is secured a rack bar 2, having the rack teeth 3. Secured to the sides of the plow beam 1, are the bars 4, 4, each bar being provided with a plurality of alined lugs 6, the bars 4, being secured by means of the screws 5.

In conjunction with the members described, I use two similar yoke blades 7, 7, each yoke blade having its inner face serrated lengthwise, as shown at 8, in Fig. 5. These blades 7, are further each provided with a transverse slot 9, near the upper end, while the outer faces of the blades are semi-cylindrical, as shown at 10, in Figs. 2 and 4, and provided with the lengthwise running grooves 11. The serrations 8, are arranged for co-action with the lugs 6, while passing through the slot 9, is the carrying bolt 12, having the nut 13.

In conjunction with the yoke blades 7, I employ a forked plow stock 15, the upper ends 16, of which are curved to fit the semi-cylindrical surface 10. As shown the upper end of the plow stock is forked so that the ends stride the plow beam 1, from below. The upper ends of the plow stock are further provided with openings to receive the supporting bolt 12, and the clamping bolt 14, having the nut 17, as shown in Fig. 1. At a suitable point, the plow stock is provided with the bolt 18, to which is secured the brace bar 19, the end 20, of which is secured to the under edge of the plow beam 1, by means of a suitable bolt 21, as shown.

According to this construction the yoke blades can be carried backward or forward in shifting the carrying bolt backward or forward between the rack teeth 3. Further owing to the cylindrical surfaces, the plow stock 15, can be tilted, the edges of the plow stock being held at times within the grooves 11. The yoke blades are held in position at their lower ends by means of the lugs 6.

After the plow stock 15, has been given the proper adjustment, the nuts 13 and 17, are screwed down to firmly hold the plow stock to the yoke blades and the yoke blades in turn to the plow beam. In the drawings no plow or colter shares are shown as secured to the plow stock 15.

By means of my adjustable plow stock the plow may be easily held in proper alinement and the soil can be properly tilled without working any undue hardship upon the draft animal or the operator guiding the plow.

The plow stock is simple and inexpensive in construction and both durable and efficient in operation, and can be given proper adjustment with ease, accuracy and despatch.

Having thus described my said invention what I claim as new and desire to secure by United States Letters Patent is:

1. The combination with a plow beam, of a rack bar secured to the upper edge thereof, said plow beam having a series of outstanding lugs upon opposite sides below said rack bar, two similar yoke plates having their inner faces serrated lengthwise and their outer faces semi-cylindrical and grooved lengthwise, each having a transverse slot within the upper end, said serration arranged for co-action with said lugs, a plow stock having its upper end forked and curved to engage said semi-cylindrical surfaces, a carrying bolt held to said rack bar extending through said slots and openings within said plow stock, and a clamping bolt below said plow beam and passing through said plow stock, as and for the purpose set forth.

2. The combination with a plow beam, of a rack bar secured to the upper edge thereof, said plow beam having a series of outstanding lugs upon opposite sides below said rack bar, two similar yoke plates having their inner faces serrated lengthwise and their outer faces semi-cylindrical and grooved lengthwise, each having a transverse slot within the upper end, said corrugations arranged for co-action with said lugs, a plow stock having its upper end forked and curved to engage said semi-cylindrical surfaces, a carrying bolt held by said rack bar extending through said slots and openings within said plow stock, a clamping bolt below said plow beam and passing through said plow stock, and a brace bar extending from said plow beam to said plow stock, as and for the purpose set forth.

3. The combination with a plow beam, of a top bar secured to the upper edge thereof, said plow beam having a series of outstanding lugs upon opposite sides below said top bar, two similar yoke plates having their inner faces serrated lengthwise and their outer faces semi-cylindrical and grooved lengthwise, each having a transverse slot within the upper end, said serration arranged for co-action with said lugs, a plow stock having its upper end forked and curved to engage said semi-cylindrical surfaces, a carrying bolt held to said top bar extending through said slots and openings within said plow stock, and a clamping bolt below said plow beam and passing through said plow stock, as and for the purpose set forth.

In testimony whereof I affix my signature, in the presence of two witnesses.

SAMUEL O. NEELY.

Witnesses:
Roy Little,
J. W. Hunter.

---

Copies of this patent may be obtained for five cents each, by addressing the "Commissioner of Patents, Washington, D. C."